United States Patent
Tang et al.

(10) Patent No.: US 9,605,177 B2
(45) Date of Patent: Mar. 28, 2017

(54) WATERBORNE DISPERSIONS

(71) Applicant: Blue Cube IP LLC, Midland, MI (US)

(72) Inventors: Houxiang Tang, Midland, MI (US); Manesh Nadupparambil Sekharan, Midland, MI (US); Ray E. Drumright, Midland, MI (US); Yinzhong Guo, Midland, MI (US)

(73) Assignee: BLUE CUBE IP LLC, Midland, MI (US)

( * ) Notice: Subject to any disclaimer, the term of this patent is extended or adjusted under 35 U.S.C. 154(b) by 161 days.

(21) Appl. No.: 14/381,766

(22) PCT Filed: Apr. 1, 2013

(86) PCT No.: PCT/US2013/034784
§ 371 (c)(1),
(2) Date: Aug. 28, 2014

(87) PCT Pub. No.: WO2013/149234
PCT Pub. Date: Oct. 3, 2013

(65) Prior Publication Data
US 2015/0079402 A1    Mar. 19, 2015

Related U.S. Application Data

(60) Provisional application No. 61/617,369, filed on Mar. 29, 2012.

(51) Int. Cl.
| C09D 163/00 | (2006.01) |
| C08L 63/00 | (2006.01) |
| C08G 59/24 | (2006.01) |
| B65D 25/14 | (2006.01) |
| B65D 25/34 | (2006.01) |

(52) U.S. Cl.
CPC ............ *C09D 163/00* (2013.01); *B65D 25/14* (2013.01); *B65D 25/34* (2013.01); *C08G 59/24* (2013.01); *C08L 63/00* (2013.01); *Y10T 428/31529* (2015.04)

(58) Field of Classification Search
None
See application file for complete search history.

(56) References Cited

U.S. PATENT DOCUMENTS

| 4,123,403 | A | 10/1978 | Warner et al. | |
| 5,593,731 | A * | 1/1997 | Akagi | C08G 59/70 427/386 |
| 5,714,532 | A * | 2/1998 | Osterholtz | C08K 5/5435 524/114 |
| 7,595,372 | B2 * | 9/2009 | Lejeune | C09D 5/028 524/588 |
| 7,893,183 | B2 * | 2/2011 | Lejeune | C08G 77/14 528/12 |
| 2005/0196629 | A1 * | 9/2005 | Bariatinsky | B65D 25/14 428/480 |
| 2013/0178584 | A1 * | 7/2013 | Jin | C08G 59/4223 524/601 |

FOREIGN PATENT DOCUMENTS

| WO | WO 2012/044455 A1 | 4/2012 |
| WO | WO 2012/044458 A1 | 4/2012 |
| WO | WO 2012/044490 A1 | 4/2012 |
| WO | WO 2012/050777 A1 | 4/2012 |

* cited by examiner

*Primary Examiner* — Robert C Loewe
(74) *Attorney, Agent, or Firm* — Polsinelli PC

(57) ABSTRACT

A waterborne dispersion containing a high molecular weight cycloaliphatic epoxy resin based on a diglycidyl ether of a cycloaliphatic diol polymerized with, for example, a diphenolic or diacid compound.

12 Claims, No Drawings

WATERBORNE DISPERSIONS

The present invention relates to waterborne dispersions. More specifically, the present invention relates to waterborne dispersions of cycloaliphatic epoxy resins.

Known epoxy resins used for metal coating applications usually contain mobile or bound bisphenol A (BPA). In some cases, cycloaliphatic epoxy (CAE) resins may provide a possible alternative for producing coatings useful for metal coating applications which do not contain BPA, i.e., coatings that are BPA-free coatings. However, known CAE resin coating formulations are solvent borne as opposed to being waterborne.

In one embodiment, the present invention includes a waterborne dispersion including a cycloaliphatic epoxy (CAE) resin such as for example a CAE resin derived from CAEs such as the diglycidyl ethers (DGEs) of 1,4-cyclohexanedimethanol (CHDM), 1,3-cyclohexanedimethanol, 2,2,4,4-tetramethylcyclobutane-1,3-diol (TMCBD), or mixtures thereof.

In general, the waterborne dispersions of the present invention are advantageously useful for metal coatings; and more specifically, the waterborne dispersions of the present invention are advantageously useful for coating metals such as metal containers or cans used for food and beverage applications.

In another embodiment, the present invention includes a process to make the above waterborne dispersion.

In still another embodiment, the present invention includes a waterborne coating formulation made from the above waterborne dispersion.

In yet another embodiment, the present invention includes a metal packaging coating formulation including the above waterborne dispersion.

In even still another embodiment, the present invention includes a coated article comprising a metal substrate coated with the above waterborne coating formulation.

In even yet another embodiment, the present invention includes a process for coating a metal substrate comprising applying the above waterborne coating formulation to a metal substrate to form a coating on the metal substrate.

The dispersion of the present invention does not intentionally contain bisphenol A; that is, BPA or BPA epoxy resin are not used in the preparation of the CAE resin present in the dispersion composition. The present inventive dispersion is also low in volatile organic compounds (VOC). The continuous phase of the dispersion or formulation of the present invention includes for example from 50 weight percent (wt %) to 100 wt % water in one embodiment.

"BPA-free" and "BPA epoxy resin-free" when used in reference to a resin, formulation or composition herein means that BPA or BPA epoxy resin are not intentionally added to a resin, formulation or composition; or intentionally used in the preparation of a resin, formulation or composition such as CAE resins. However, "BPA-free" and "BPA epoxy resin-free" may include trace amounts (e.g. less than 1000 ppm of BPA and/or BPA epoxy resin in a resin, formulation or composition, for example, as a result of possible cross-contamination from manufacturing/shipping that introduces the accidental trace amounts of BPA and/or BPA epoxy resin.

"Waterborne" herein means the continuous phase of the dispersion or formulation comprises generally from 50 wt % to 100 wt % water in one embodiment, from 60% to 100% water in another embodiment, and from 70% to 100% water in still another embodiment.

"High molecular weight" herein means a weight average molecular weight above 1000 in one embodiment, above 2000 in another embodiment, and above 3000 in still another embodiment.

In its broadest scope, the present invention includes a waterborne dispersion including cycloaliphatic epoxy-containing resin dispersed in a liquid aqueous vehicle. In one embodiment, the cycloaliphatic epoxy (CAE)-containing resins can be derived from one or more CAE compounds by reacting the CAE with, for example, one or more diphenolic compounds, one or more or diacid compounds, or combinations thereof.

For example, U.S. Provisional Patent Application Ser. Nos. 61/388,071, 61/388,072, 61/388,077, and 61/388,089 disclose an advanced epoxy resin of cycloaliphatic diglycidyl ether which is advanced with an aromatic diol. The advanced cycloaliphatic epoxy resins described in the above patent applications are useful in coatings applications, particularly for internal or external protective coatings for cans and other metal packaging coatings. The advanced cycloaliphatic epoxy resins described in the above patent applications can be made water dispersible by functionalizing the resins with an unsaturated acid monomer such as acrylic acid; thus, making the water dispersible advanced epoxy resins disclosed in the above patent applications useful for ultimately preparing the cycloaliphatic epoxy (CAE)-containing resins of the present invention which can be used in waterborne coating applications for beverage and food cans.

In a preferred embodiment, the waterborne dispersion of the present invention includes (a) a cycloaliphatic epoxy-containing resin; (b) a liquid aqueous vehicle; and (c) optionally, an interfacial active material such as for example a dispersant, a surfactant, or a stabilizer.

The first compound present in the waterborne dispersion of the present invention includes a cycloaliphatic epoxy-containing resin. The cycloaliphatic epoxy-containing resin, herein referred to as "CAER", useful in the waterborne dispersion of the present invention may be provided herein from several sources and may include for example (i) an unmodified CAER; (ii) a chemically modified CAER; or (iii) a CAER comprising an acrylic polymer.

In one embodiment, the unmodified CAER useful in the present invention may be prepared according to the process described in U.S. Provisional Patent Application Ser. Nos. 61/388,071, 61/388,072, 61/388,077, and 61/388,089; incorporated herein by reference. This unmodified CAER is then used directly with other compounds such as an aqueous liquid vehicle to prepare the waterborne dispersion of the present invention. For example, the unmodified CAER may be mixed with a surfactant and then the resulting product can be mixed with an aqueous vehicle such as for example water to form the waterborne dispersion.

In one illustrative embodiment, a high molecular weight CAER may be prepared by melt polymerization (fusion process) of a cycloaliphatic diglycidyl ether with diphenol using a phosphonium salt catalyst at a temperature of from 150° C. to 230° C. in one embodiment, from 180° C. to 220° C. in another embodiment, and from 200° C. to 215° C. in still another embodiment. In one specific embodiment for example, a cyclohexanedimethanol diglycidyl ether is polymerized with catechol using ethyltriphenylphosphonium salt catalyst.

For example, the process for synthesizing the cycloaliphatic diglycidyl ether useful in the present invention is described in U.S. Provisional Patent Application Nos. 61/388,071; 61/388,072, 61/388,089; and 61/388,077 all with a filing date of Sep. 30, 2010; all of which are incorporated herein by reference. For example, the process may provide a cycloaliphatic diglycidyl ether polymerized with a diphenolic compound to form a high molecular weight CAER of the present invention. The purity of the cycloaliphatic diglycidyl ether comprises a cycloaliphatic diglycidyl ether compound with an oligomer content in the range of from 0 wt % to 20 wt % in one embodiment, and from 0.01 wt % to 10 wt % in another embodiment; and/or a monoglycidyl ether content of from 0 wt % to 10 wt % in one embodiment, and from 0.01 wt % to 5 wt % in another embodiment.

The diphenolic compound may include for example catechol, resorcinol, biphenol, and dihydroxynaphthalene, or mixtures thereof. The mole ratio of phenolic to glycidyl ether may be for example generally from 0.7/1 to 0.99/1 in one embodiment, from 0.8/1 to 0.98/1 in another embodiment, from 0.9/1 to 0.97/1 in still another embodiment, and from 0.94/1 to 0.96/1 in yet another embodiment.

In another embodiment for example, the unmodified CAER may be dissolved in a solvent in the presence of a surfactant; and then the resulting product can be mixed with an aqueous vehicle such as for example water to form the waterborne dispersion. For example, a high molecular weight CAER may be prepared by solution polymerization of cycloaliphatic diglycidyl ether with a diphenol using phosphonium salt catalysts at a temperature of from 150° C. to 170° C. in one embodiment, and from 160° C. to 165° C. in another embodiment. In one specific embodiment for example CHDM DGE may be solution polymerized with catechol in diglyme using tetrabutylphosphonium salt catalyst.

The solvent for the solution polymerization may be other non-hydroxyl containing high boiling point solvents, such as xylene, and MIBK, or mixtures thereof; and the catalyst may include other known phosphonium catalysts.

In another embodiment, the unmodified CAER can be chemically modified by reacting the unmodified CAER with reactant such as an anhydride or sultone to form an acid functionalized modified CAER or grafted with a vinyl acids such as acrylic acid, methacrylic acid, or itaconic acid to form an acid functionalized modified CAER; and then the resulting modified CAER can be neutralized with an organic or inorganic base, and mixed with an aqueous vehicle such as for example water to form the waterborne dispersion.

In still another embodiment, the unmodified CAER can be modified with acrylic polymer according to a miniemulsion and polymerization process. This process includes the steps of first dissolving the unmodified CAER in one or more acrylate monomers to form a solution of CAER and then dispersing the solution in an aqueous vehicle such as water in the presence of an interfacial active material such as for example a surfactant to form a miniemulsion of a CAER. The miniemulsion is then polymerized to form an aqueous dispersion wherein the dispersed phase comprises CAER and acrylic polymer.

The amount of the CAER, prepared by any of the above methods, used in the waterborne dispersion of present invention may range generally from 10 wt % to 100 wt % in one embodiment, from 10 wt % to 99.5 wt % in another embodiment, from 20 wt % to 98 wt % in still another embodiment, and from 30 wt % to 96 wt % in yet another embodiment, based on the total weight of the solids of the composition.

The solids content of the waterborne dispersion of the present invention may range generally from 5 wt % to 90 wt % in one embodiment, from 10 wt % to 80 wt % in another embodiment, from 20 wt % to 70 wt % in still another embodiment, and from 30 wt % to 60 wt % in yet another embodiment, based on the total weight of the composition.

The monomers used in preparing the waterborne dispersion of CAER comprising acrylic polymer of the present invention may include at least one vinyl monomer such as one or more acrylic monomers. For example, the acrylic monomer useful in the present invention may include methylmethacrylate (MMA), butylacrylate (BA), glycidylmethacrylate (GMA), hydroxyethylmethacryalate (HEMA), hydroxyethylacrylate, acrylonitrile, styrene, acrylic acid, methacrylic acid, itaconic acid, or mixtures thereof.

The concentration of acrylic monomer useful in the present invention is defined by the molecular weight of the epoxy and by the viscosity of the resulting solution. However, in general, the concentration of the acrylic monomer used in the present invention may range from 0 wt % to 95 wt % in one embodiment, from 10 wt % to 90 wt % in another embodiment, from 20 wt % to 80 wt % in still another embodiment, and from 30 wt % to 70 wt % in still another embodiment, based on the total weight of the composition.

The CAER used in the present invention may include for example an epoxy resin advanced from diglycidyl ether of cyclohexanedimethanol (CHDM DGE) with a diphenol; a high molecular weight epoxy polyester resin advanced from CHDM DGE and a diacid or mixtures thereof. Non-limiting examples of the epoxy resins useful in the present invention include an epoxy resin derived from CHDM DGE and resorcinol, CHDM DGE and catechol, UNOXOL DIOL DGE (UNOXOL DIOL is a mixture of 1,3 and 1,4-cyclohexanedimethanol available from Dow Chemical) and resorcinol, TMCBD DGE and resorcinol, UNOXOL DIOL DGE and catechol, CHDM DGE and isophthalic acid, CHDM DGE and terephthalic acid, CHDM DGE and naphthalene dicarboxylic acid, UNOXOL DIOL DGE and naphthalene dicarboxylic acid, TMCBD DGE and isophthalic acid, UNOXOL DIOL DGE and isophthalic acid, UNOXOL DIOL DGE and terephthalic acid, or mixtures thereof.

In a preferred embodiment, the CAER useful in the waterborne dispersion may include for example, cyclohexanedimethanol diglycidyl ether (CHDM DGE) and catechol; UNOXOL DIOL diglycidyl ether and catechol; 2,2,4,4,-tetramethyl-1,4-cyclo-butanediol diglycidyl ether and catechol; or mixtures thereof.

In one embodiment, the CAER useful in the present invention comprises a high epoxide equivalent epoxy number (EEW) and high weight average molecular weight CAER. For example, the weight average molecular weight of the CAER used in the present invention can be from 1,000 Dalton to 100,000 Dalton in one embodiment, from 3,000 Dalton to 80,000 Dalton in another embodiment, and from 10,000 Dalton to 50,000 Dalton in still another embodiment. The EEW of the epoxy resin may range from 500 to 40,000 in one embodiment, from 1000 to 20,000 in another embodiment, and from 2000 to 10,000 in still another embodiment.

The second compound present in the waterborne dispersion of the present invention includes a liquid aqueous vehicle. In one embodiment for example, the liquid aqueous vehicle to disperse the CAER can be water alone, or can be water mixed with an organic solvent or a solvent mixture. For example, the solvent may include glycol ethers, alcohols, esters, hydrocarbons, ketones, amines, aromatics, or mixtures thereof.

The amount of the liquid aqueous vehicle used in the waterborne dispersion of present invention may range generally from 10 wt % to 95 wt % in one embodiment, from 20 wt % to 90 wt % in another embodiment, from 30 wt % to 80 wt % in still another embodiment, and from 40 wt % to 70 wt % in yet another embodiment, based on the total weight of the composition.

Various optional compounds or additives may be added to the waterborne dispersion of the present invention including for example an interfacial active material such as a dispersant (or dispersing aid), a surfactant, or a stabilizer to provide a stable dispersion of the particles in the waterborne dispersion. For example, when a surfactant is used as the optional interfacial active material, the amount of the surfactant used in the of present invention may range generally from 0.1 wt % to 10 wt % in one embodiment, from 1 wt % to 8 wt % in another embodiment, from 2 wt % to 7 wt % in still another embodiment, and from 3 wt % to 6 wt % in yet another embodiment, based on the total weight of the composition.

One embodiment of the process for preparing the waterborne dispersion of the present invention includes admixing (a) at least one CAER; (b) a liquid aqueous vehicle; and (c) optionally, an interfacial active material such as for example a dispersant, a surfactant, or a stabilizer. For example, the preparation of the waterborne dispersion of the present invention is achieved by admixing in a vessel the at least one CAER; the aqueous vehicle; and optionally any one or more other desirable additives such as the interfacial active material. The mixture is then allowed to formulate into a waterborne dispersion composition.

All the components of the waterborne dispersion are typically mixed and dispersed at a temperature to provide an effective waterborne dispersion composition having a uniform dispersion for the desired application. The temperature during the mixing of the above components may be generally from 25° C. to 120° C. in one embodiment; and from 25° C. to 85° C. in another embodiment.

The preparation of the waterborne dispersion of the present invention, and/or any of the steps thereof, may be a batch or a continuous process. The mixing equipment used in the process may be any equipment such as a stirred tank, a stirred reactor, a static mixer, a rotor stator mixer, a sonic horn, a homogenizer, and ancillary equipment well known to those skilled in the art.

When using the miniemulsion process as described above, (A) at least one CAER; (B) at least one acrylic monomer; and (C) an aqueous vehicle are mixed together. For example, in this process embodiment, the preparation of the waterborne dispersion of the present invention may be achieved by admixing in a vessel the at least one CAER; the at least one acrylic monomer; the aqueous vehicle; and optionally any other desirable additive are mixed under shear to form a miniemulsion and then polymerizing the acrylic monomer or acrylic monomer mixture and allowing the components to formulate into a waterborne dispersion composition.

All of the unsaturated monomers, or a portion of the unsaturated monomers, can be mixed with the epoxy resin prior to forming the initial cycloaliphatic epoxy resin dispersion. It is desirable that unsaturated monomers added to the cycloaliphatic epoxy resin prior to forming the initial cycloaliphatic epoxy resin dispersion be miscible with the cycloaliphatic epoxy resin and even plasticize the cycloaliphatic epoxy resin to facilitate forming the initial cycloaliphatic epoxy resin dispersion. When unsaturated monomers are present in the cycloaliphatic epoxy resin particles of the initial cycloaliphatic epoxy resin dispersion, the polymerization of the unsaturated monomers to form polymer is a type of miniemulsion polymerization, where monomer that is undergoing polymerization is present in a dispersed particle that has a particle size of for example one micron or less.

The plasticizing unsaturated monomer may be selected for example from a group consisting of acrylate, methacrylate, and styrenic monomers that plasticize the cycloaliphatic epoxy resin. The monomers that are copolymerized to form a polymer may be selected for example from a group consisting of methyl acrylate, ethyl acrylate, butyl acrylate, 2-ethylhexyl acrylate, decyl acrylate, methyl methacrylate, ethyl methacrylate, butyl methacrylate, acrylic acid, methacrylic acid, itaconic acid, maleic acid, fumaric acid, styrene, substituted styrene, acrylonitrile, vinyl acetate, other alkyl acrylates having from one to twelve carbon alkyl groups, and mixtures thereof.

The cycloaliphatic epoxy resin may be dispersed into the aqueous phase using a batch, semi-continuous or continuous process. Batch processes include preparing the cycloaliphatic epoxy resin dispersion in a single container by adding the aqueous phase and cycloaliphatic epoxy resin together while mixing. In one embodiment, the cycloaliphatic epoxy resin may be added to the aqueous phase while mixing; however, in another embodiment, both the aqueous phase and cycloaliphatic epoxy resin can be added together to the vessel while mixing; or in still another embodiment, the cycloaliphatic epoxy resin can be added first and the aqueous phase added second while mixing. In yet another embodiment, it may also be possible to add the cycloaliphatic epoxy resin and aqueous phase together without mixing and, once the two components have been combined, then mix them together to form a dispersion. In even still another embodiment, it may be desirable to form the cycloaliphatic epoxy resin dispersion by a continuous method where both aqueous phase and cycloaliphatic epoxy resin are mixed together in a continuous stream to produce a cycloaliphatic epoxy resin dispersion.

One method for continuously producing the initial cycloaliphatic epoxy resin dispersion can be carried out by mechanical dispersion, such as described in U.S. Pat. No. 4,123,403, incorporated herein by reference. In a mechanical dispersion process an aqueous phase and an organic phase are fed together through a high shear mixer that disperses one phase into the other, typically forming a high internal phase emulsion or high internal phase dispersion. High internal phase emulsions and dispersions have greater than 74 volume-percent internal phase dispersed within a continuous phase where volume percent is relative to the total emulsion or dispersion volume. In the context of the process of the present invention, a cycloaliphatic epoxy resin (typically either as a melt or as a resin dissolved in acrylic monomer or solvent) and an aqueous phase can be fed into a high shear mixer to produce a dispersion of cycloaliphatic epoxy resin in the aqueous phase. A high internal phase dispersion of cycloaliphatic epoxy resin in aqueous phase is produced, which can be diluted down with additional aqueous phase if desired, for example, to reduce the viscosity of the dispersion.

A particularly desirable benefit of mechanical dispersion is that this process can produce dispersions with dispersed particles having a highly uniform particle size (narrow particle size distribution). Moreover, the highly uniform particle size of such dispersion can be two micrometers or less in one embodiment, and one micrometer or less in another embodiment. For example, the dispersion may have particles in the size range of from 100 nanometers to 5,000 nanometers in one embodiment, and from 100 nanometers to 500 nanometers in another embodiment.

It may be required to use a dispersing aid to prepare the initial cycloaliphatic epoxy resin dispersion. A dispersing aid can serve to stabilize cycloaliphatic epoxy resin particles in the aqueous phase. A dispersing aid can be added to the cycloaliphatic epoxy resin prior to dispersing, to the aqueous phase prior to dispersing the cycloaliphatic epoxy resin, or added to the initial cycloaliphatic epoxy dispersion as the cycloaliphatic epoxy resin and aqueous phase are being mixed. If added prior or during formation of the initial cycloaliphatic epoxy resin dispersion, the dispersing aid may be present at a concentration of for example, generally from 0.1 wt % to 10 wt % in one embodiment, from 1 wt % to 8 wt % in another embodiment, from 2 wt % to 7 wt % in still another embodiment, and from 3 wt % to 6 wt % in yet another embodiment, based on the total weight of the composition.

One exemplary embodiment of the present invention uses 4 wt % of a dispersing aid such as Hitenol BC 10 to form an initial dispersion of cycloaliphatic epoxy resin, with the 4 wt % being relative to the total epoxy resin weight. The dispersing aid or dispersant can be optionally incorporated into the polymer network during miniemulsion polymerization if it bears polymerizable functionality.

In the miniemulsion process, a free radical initiator is fed into the initial cycloaliphatic epoxy resin before, during or after addition of the unsaturated monomers or during or after formation of the miniemulsion. The miniemulsion is subjected to conditions that result in free radical polymerization while stirring so as to polymerize the unsaturated monomer. The free radical initiator serves to trigger polymerization of the unsaturated monomers. Suitable free radical initiators include thermal and/or redox triggered initiators, preferably that are water soluble. Examples of suitable thermally triggered initiators include for example persulfate salts (for example, sodium persulfate and ammonium persulfate). Suitable redox initiators include for example combinations of an oxidizing agent (such as persulfate salt and organic peroxides) and reducing agents (such as sodium formaldehyde sulfoxylate) and a redox catalyst such a iron (II) sulfate. The conditions that result in free radical polymerization can depend on the type of free radical initiator added. For example, thermally triggered initiators may decompose and trigger free radical polymerization in the presence of unsaturated monomers at a temperature above their decomposition temperature (initiation temperature). Thermally triggered initiators may require applying heat to the mixture of initial epoxy dispersion, unsaturated monomers and initiators achieve conditions that result in free radical polymerization depending on the initiation temperature of the initiator and the ambient temperature of the mixture. Redox initiators may require the presence of an appropriate reducing and oxidization agent pair that when mixed together reacts to form polymerization initiating free radicals.

The amount of free radical initiator may be generally from 0.01 wt % or more in one embodiment, and from 0.1 wt % or more in another embodiment; while at the same time may be generally 2 wt % or less, based on the unsaturated monomer weight.

In another embodiment, the waterborne dispersion of the present invention may be prepared for example by modification of the high molecular weight cycloaliphatic epoxy resin with an anhydride at a temperature of from 120° C. to 170° C., neutralized with basic reagent, and dispersed in water with mechanical mixing.

A solvent may be used for the above modification and may include for example solvents such as methylethyl ketone (MEK), methyl isobutyl ketone (MIBK), dimethyl diglycol ether, N-methyl pyrrolidinone (NMP), other non-hydroxyl-containing solvents, or mixture thereof.

The above modification may be conducted at a temperature of from 120° C. to 170° C. in one embodiment and from 140° C. to 160° C. in another embodiment with a catalyst or without a catalyst. The catalyst, when used, may be for example triethyl amine, pyridine, imidazoles, dimethylaminopyridine, other tertiary amines, or a mixture thereof.

The neutralization agent may be triethyl amine, dimethyl ethanol amine, other tertiary amines, secondary amines, primary amines, or mixtures thereof. The neutralization may be for example 70% of acid in one embodiment, 100% of acid in another embodiment, and 150% of acid in still another embodiment.

The anhydride for the cycloaliphatic epoxy resin modification may be for example an aliphatic anhydride such as succinic anhydride; substituted succinic anhydride; maleic anhydride; substituted maleic anhydride; other aliphatic anhydrides; aromatic anhydrides such as phthalic anhydride, naphthanlenic anhydride; other aromatic anhydrides; or mixture thereof.

The acid modified epoxy resin of the present invention can also be prepared by reacting the cycloaliphatic epoxy resin with sultones or free radical grafting with unsaturated acid monomers such as acrylic acid, methacrylic acid, itaconic acid, and mixtures thereof.

As aforementioned, the process of preparing the waterborne dispersion of the present invention, and/or any of the steps thereof, may be a batch or a continuous process; and the mixing equipment used in the process may be any equipment such as a stirred tank, a stirred reactor, a static mixer, a rotor stator mixer, a sonic horn, a homogenizer, and ancillary equipment well known to those skilled in the art.

In another embodiment, the dispersion recipe can contain a hardener or curing agent such as a phenolic resole resin along with CAER prior to the dispersion process. For example in a miniemulsion process; the preparation of the waterborne dispersion of the present invention containing curing agent is achieved by admixing in a vessel the at least one CAER; the at least one acrylic monomer; at least a curing agent, in this case a phenolic resole resin and the aqueous vehicle and optionally any other desirable additive are mixed under shear to form a miniemulsion and then polymerizing the miniemulsion to form a waterborne dispersion composition.

The waterborne dispersion of the present invention advantageously has a low viscosity. By "low viscosity" with reference to the waterborne dispersion of the present invention, it is meant that the waterborne dispersion has a viscosity sufficient to process the dispersion. Generally, the viscosity of the waterborne dispersion may be dependent on the solid loading of the dispersion, the composition of the resin solid, the additives used, and other considerations. However, advantageously, the viscosity of the waterborne dispersion of the present invention is generally much lower than a corresponding solvent borne solution at the same solid loading.

For example, in one general illustrative embodiment, when the particle size of the dispersion is from 50 nm to 5 microns and the pH of the dispersion is from 6 to 10, the viscosity of the waterborne dispersion may be from 5 mPa-s to 10,000 mPa-s; wherein the viscosity is measured under the mixing conditions of the waterborne dispersion such as for example at a temperature of 25° C.

The waterborne dispersion described above is beneficial for preparing a thermosettable or curable coating formulation adapted to being applied to a substrate and cured as a coating on the substrate such as a metal substrate and wherein the metal substrate may include metal cans for the food and beverage industry.

In one embodiment, the curable coating formulation can include a formulation containing the waterborne dispersion of the present invention which includes the CAER; and wherein the CAER can be self-curing by virtue of the epoxy groups in the CAER being present in the curable coating formulation; or by virtue of other crosslinkable functionality being built into the resin solid.

In another embodiment, the curable coating formulation includes a mixture of (i) the waterborne dispersion of the present invention, and (ii) a hardener compound (also referred to as a curing agent or cross-linking agent). In addition, the curable coating formulation containing the waterborne dispersion of the present invention admixed with a curing agent may also include various optional additives such as for example other crosslinkers, curing catalysts, adhesion promoters, solvents, wetting agents, antioxidants, lubricants, pigments and other known additives known in the art for preparing a coating formulation.

Generally, the amount of non-volatile components, i.e., the solid content, in the curable coating composition of present invention may be in the range from 1 wt % to 90 wt % in one embodiment, from 15 wt % to 80 wt % in another embodiment, from 20 wt % to 70 wt % in still another embodiment, and from 30 wt % to 60 wt % in yet another embodiment.

The hardener compound useful in the curable coating composition or formulation of the present invention may be any compound having an active group being reactive with the reactive epoxy group of the epoxy resin and/or the hydroxyl group or acid groups in the cycloaliphatic epoxy resin, or other reactive groups present in the composition. The hardener useful in the present invention may include for example oxygen-containing compounds such as carboxylic acid terminated polyesters, hydroxyl functionalized acrylic polymers, carboxylic acid terminated acrylic polymers, anhydrides, phenol-formaldehyde resins, amino-formaldehyde resins, phenol, bisphenol A and cresol novolacs; phenolic-terminated epoxy resins; hydroxylalkyl amides; sulfur-containing compounds such as polysulfides and polymercaptans; isocyanates; carbodiimides; catalytic curing agents such tertiary amines, Lewis acids, and Lewis bases; and combinations of two or more of the above hardeners.

In one preferred embodiment for example, phenolic resoles, amino formaldehydes, benzoguanamine formaldehydes, and mixtures thereof may be used as the hardeners in the coating formulation of the present invention, but the present invention is not restricted to the use of these compounds. The hardeners of choice may also depend on the application requirements. Generally, the hardener useful in the present invention may be selected from, for example, but are not limited to, phenolic resole, amino formaldehyde, glycoluril formaldehyde, benzoguanomine formaldehyde, and mixtures thereof.

Generally, the amount of hardener used in the coating formulation of present invention may be in the range from 5 wt % to 60 wt % of the resin solid in one embodiment; from 5 wt % to 50 wt % of the resin solid in another embodiment; from 5 wt % to 40 wt % of the resin solid in still another embodiment; and from 10 wt % to 30 wt % of the resin solid in yet another embodiment. In general, the higher the level of hardener, the higher the hardness and acid resistance and the lower the flexibility of the resulted coating. Depending on the final application, a skilled artisan can adjust the level of hardener accordingly.

The curable coating formulation may also include other optional resins or polymers such as polyesters, acrylics, polyamides, polyethers, novolacs, another epoxy resin, or mixtures thereof. These optional polymers can be included in a coating formulation as an additive material or as a crosslinking material to provide desirable properties/functionalities, at the appropriate level without negatively impacting other properties of the resulted coating. Preferred optional polymers include BPA-free and BPA epoxy resin-free polymers.

In one embodiment, the curable coating formulation of the present invention includes the waterborne dispersion described above containing a CAER as a first epoxy compound; and another different epoxy resin, different from the first CAER, as a second epoxy compound.

The second epoxy may include one or more epoxy compounds selected from a wide variety of epoxy compounds. For example, the second epoxy compound useful in the present invention may be saturated or unsaturated, aliphatic, cycloaliphatic, aromatic or heterocyclic and may be substituted. The second epoxy compound may also be monomeric or polymeric. For example, the second optional epoxy compound useful in the present invention may be selected from any epoxy resin or combination of two or more epoxy resins known in the art such as for example any of the epoxy compounds described in Pham, H. Q. and Marks, M. J. *Epoxy Resins* in the Kirk-Othmer Encyclopedia of Chemical Technology; John Wiley & Sons, Inc.: online Dec. 4, 2004 and in the references therein; in Lee, H. and Neville, K., *Handbook of Epoxy Resins*, McGraw-Hill Book Company, New York, 1967, Chapter 2, pages 2-1 to 2-27, and in the references therein; May, C. A. Ed. *Epoxy Resins: Chemistry and Technology*, Marcel Dekker Inc.: New York, 1988 and in the references therein; and in U.S. Pat. No. 3,117,099; all which are incorporated herein by reference.

Suitable epoxy resins useful in the present invention include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy resin may also be selected from commercially available products such as for example, D.E.R.® 354, D.E.N.® 425, D.E.N. 431, D.E.N. 438, D.E.R. 736, or D.E.R. 732, commercially available from The Dow Chemical Company.

In applications where a BPA composition is desired to be present in the epoxy resin composition, in an alternative embodiment, the second epoxy resin can be bisphenol A diglycidyl ether or an epoxy resin containing BPA, such as for example D.E.R. 331®, D.E.R.332, D.E.R. 671, commercially available from The Dow Chemical Company.

The concentration of the second epoxy compound used in the present invention may range generally from 0 wt % to 50 wt % in one embodiment, from 0.01 wt % to 40 wt % in another embodiment, and from 5 wt % to 30 wt % in still another embodiment, based on the total weight of the epoxy resin.

In another embodiment of the present invention, the coating formulation of the present invention may be optionally blended with other water dispersions such as for example waterborne dispersion of phenolics, polyolefins, epoxies, polyesters, and polycarbonates; and emulsions such as acrylics; or mixtures thereof.

When used, the amount of the other water dispersions blended with the waterborne coating formulation of the present invention may range generally from 0.1 wt % to 50 wt % in one embodiment, from 5 wt % to 40 wt % in another embodiment, and from 5 wt % to 30 wt % in still another embodiment, based on the total weight of the composition.

In another embodiment, the curable waterborne coating formulation may also include, as an optional component, at least one catalyst to facilitate the reaction of the epoxy resin compound(s) with the curing agent. The catalyst useful as an optional component in the composition of the present invention may include catalysts well known in the art, such as for example, catalyst compounds containing, acid, amine, phosphine, heterocyclic nitrogen, ammonium, phosphonium, arsonium, sulfonium moieties, and any combination thereof. Some non-limiting examples of the catalyst of the present invention may include, for example, dodecylbenzyl sulfonic acid, amine blocked dodecylbnezylsulfonic acid, phosphoric acid, nonylnaphthalene disulfonic acid, and combination thereof.

The selection of the catalyst useful in the present invention is not limited to any particular catalyst; and commonly used catalysts for epoxy systems can be used. Also, the addition of a catalyst to the curable composition of the present invention may depend on the system prepared. For example, the catalyst may include tertiary amines, imidazoles, organo-phosphines, acid salts, and mixtures thereof.

In one embodiment, the catalyst may include tertiary amines such as, for example, triethylamine, tripropylamine, tributylamine, 2-methylimidazole, benzyldimethylamine, or mixtures thereof.

In another embodiment, the curing catalyst may include for example imidazole derivatives such as 2-ethyl-4-methyl imidazole; tertiary amines; organic metallic salts; and cationic photoinitiators, for example, diaryliodonium salts such as Irgacure™ 250 available from Ciba-Geigy or triarylsulfonium salts such as Cyracure* 6992 available from The Dow Chemical Company.

In one embodiment, the curing catalyst may be added to the water dispersion, to the second epoxy resin, if used; or to the curable coating composition as the composition is being formed.

The concentration of the curing catalyst used in the present invention generally may be from 0 wt % to 5 wt % in one embodiment, from 0.01 wt % to 5 wt % in another embodiment, and from 0.1 wt % to 3 wt % in still another embodiment, based on the total weight of the curable composition.

In another embodiment, the curable waterborne coating formulation may also include, as an optional component, at least one filler material. The filler material may be used to improve viscosity and thermal properties of the cured product made from the curable formulation, particularly when the formulation is useful for coating applications. The filler useful in the present invention includes for example functional or non-functional fillers such as for example, silica, titanium dioxide, aluminum trihydroxide, aluminum hydroxide oxide, boron nitride, silicon carbide, mica, aluminum powder, zinc oxide, silver, graphite, aluminum nitride, aluminum oxide, mullite, gold, aluminum, carbon, carbon nanotubes, graphene, glass fibers/sheets, carbon fibers, other organic or inorganic particulate fillers, or mixtures thereof; either added into the formulation in the filler's end state or formed in-situ. These fillers can be treated to improve filler and polymer interaction.

The acceptable particle size of the filler material generally may range from nano to conventional micro size. For example, the particle size of the filler may be generally in the range of from 0.005 microns (μm) to 500 μm in one embodiment, from 0.100 μm to 100 μm in another embodiment, and from 0.5 μm to 20 μm in still another embodiment.

The acceptable filler morphologies of the filler material useful in the present invention include platelet, fibrous, spherical, amorphous, or any combination thereof. These fillers with different size and different shape may be combined to have a synergistic effect on coefficient of thermal expansion (CTE), modulus, and heat conductivity.

Filler loadings useful in the present invention may vary. Generally, the concentration of the filler used in the composition may include from 0 wt % to 90 wt % in one embodiment, from 0.01 wt % to 40 wt % in another embodiment; and from 0.1 wt % to 20 wt % in still another embodiment, based on the weight of the solids in the composition.

Other optional components, that may be useful in the present invention, are components normally used in resin coating formulations known to those skilled in the art. For example, the optional compounds may comprise compounds that can be added to the composition to enhance the reaction rate, the selectivity of the reaction, and/or the catalyst lifetime. An assortment of optional additives may be added to the curable waterborne coating formulation of the present invention including for example, other resins, stabilizers, plasticizers, catalyst de-activators, dyes, pigments, thixotropic agents, photo initiators, latent catalysts, inhibitors, solvents, surfactants, fluidity control agents, diluents that aid processing, adhesion promoters, flexibilizers, toughening agents, fire retardants; or mixtures thereof.

The concentration of the optional additives used in the present invention may range generally from 0 wt % to 20 wt % in one embodiment, from 0.01 wt % to 10 wt % in another embodiment, and from 0.5 wt % to 5 wt % in still another embodiment, base on the weight of all the components in the composition.

The process for preparing the waterborne coating formulation of the present invention includes admixing: (A) the waterborne dispersion described above; (B) the hardener described above; and (C) any desired optional additives described above such as at least one cure catalyst. For example, the preparation of the waterborne coating formulation of the present invention is achieved by admixing in a vessel the waterborne dispersion; the hardener; and optionally any other desirable additive; and then allowing the components to formulate into the waterborne coating formulation.

All the components of the waterborne coating formulation are typically mixed and dispersed at a temperature to provide an effective the waterborne coating formulation having a uniform dispersion for the desired application. The temperature during the mixing of the above components may be generally from 20° C. to 100° C. in one embodiment, and from 25° C. to 50° C. in another embodiment.

The preparation of the waterborne coating formulation of the present invention, and/or any of the steps thereof, may be a batch or a continuous process. The mixing equipment used in the process may be any vessel and ancillary equipment well known to those skilled in the art.

Generally, the curable waterborne coating formulation used as a coating composition of the present invention advantageously has a viscosity and rheological characteristics such that the curable waterborne coating formulation can be applied to a substrate as a coating.

The present invention process generally includes the first step of applying the curable waterborne coating formulation of the present invention to a substrate; and then curing the coating formulation. The substrate to be coated by the coating formulation of the present invention, may include for example, a metal substrate such as aluminum, tin plated steel, and tin free steel.

Applying the curable coating formulation onto the above substrate includes various known processes such as rolling, spraying, and dipping. The application of the curable coating formulation onto the substrate, and/or any of the steps thereof may be a batch or a continuous process. The application equipment used in the process may be equipment well known to those skilled in the art.

The present invention process generally includes the step of curing the curable waterborne coating formulation of the present invention that has been coated onto a substrate. For example, curing the curable waterborne coating formulation may be carried out by heating the coated substrate at a predetermined temperature and for a predetermined period of time sufficient to cure the coating formulation. Curing the composition may be dependent on the type of hardeners used and/or other additives used in the curable formulation. However, in general the curing may be carried out a temperature of from 20° C. to 250° C. in one embodiment; from 60° C. to 275° C. in another embodiment; and from 160° C. to 300° C. in still another embodiment. The curing can be carried out for a time period of from 5 seconds to 15 minutes in one embodiment; from 30 seconds to 4 minutes in another embodiment; and from 8 minutes to 12 minutes in still another embodiment. Depending on the application requirements, multiple curing temperatures and/or different durations of curing time can be selected by a person skilled in the art.

The thermoset or cured coating (i.e. the cross-linked coating on a substrate prepared from the curable waterborne coating formulation) shows several improved properties over conventional cured epoxy coating resins. For example, the cured coating of the present invention may have a beneficial flexibility property while maintaining a balance of the other beneficial properties of the cured product such as adhesion and chemical resistance.

For example, the flexibility of the cured coating, as measured by wedge bend impact test as described in ASTM D3281 method, may be generally from 80% to 100% pass in one embodiment; from 90% to 100% pass in another embodiment; and from 95% to 100% pass in still another embodiment.

For example, the adhesion of the cured coating, as measured by crosshatch adhesion test as described in ASTM D 3359 method, may be generally from 0B to 5B in one embodiment; from 3B to 5B in another embodiment; and from 4B to 5B in still another embodiment.

For example, the chemical resistance of the cured coating, as measured by MEK double rub test as described in ASTM D 5402-06 Method, may be generally from 50 cycles to 200 cycles in one embodiment; from 100 cycles to 200 cycles in another embodiment; and from 25 cycles to 150 cycles in still another embodiment.

The coating formulation of the present invention may comprise a waterborne dispersion including (a) a high molecular weight cycloaliphatic epoxy resin dispersed in (b) a liquid aqueous vehicle and the formulation can be used as a metal packaging coating to form a coated article. A process for coating a metal substrate includes applying the above coating formulation to a metal substrate and curing the coating formulation to form a coating on the metal substrate.

Using the process of the present invention, various articles can be made from the above coating formulation and process such as a metal packaging coating.

As aforementioned, the waterborne dispersion of the present invention may be used to prepare a curable waterborne coating formulation such that the curable coating formulation may be useful for coating metal substrates. For example, the metal substrate or metal article coated with the waterborne coating formulation of the present invention may be used for metal containers which in turn are used in food and beverage metal cans. In another embodiment, the coating can be useful for coil coatings. Other applications where a BPA-free coating is useful may also employ the curable waterborne coating formulation of the present invention.

The following examples and comparative examples further illustrate the present invention in detail but are not to be construed to limit the scope thereof.

In the following Examples, various terms and designations were used including for instance: Phenodur 899 which is a phenolic resin, commercially available from Cytec; Phenodur VPW which is a waterborne phenolic resin supplied by Cytec; Methylon 75108 which is allyl ether capped resole available from Durez; Unoxol diol diglycidyl ether which is an epoxy prepared from UNOXOL Diol available from The Dow Chemical Company; UNOXOL Diol DGE/Catechol epoxy resin which an experimental epoxy resin with an EEW of t 6500; "MMA" which stands for methyl methacrylate; "BA" which stands for butyl acrylate; "GMA" which stands for glycidyl methacrylate; "HEMA" which stands for hydroxyethylmethacrylate; "DI water" which stands for deionized water; "$V_{avg}$" which stands for Volume average particle size; Hitenol BC-10 which is a polymerizable anionic surfactant commercially available from Montello Inc.; Cymel 370 which is a melamine formaldehyde crosslinker supplied by Cytec; Georgia Pacific GP4003 which is waterborne phenolics crosslinker supplied by Georgia Pacific; Nacure 5965 which is dodecylbenzylsulfonic acid crosslinking catalyst supplied by King Chemical.

EXAMPLE 1

Preparation of Crosslinker Resin Containing Epoxy—Acrylic Dispersions

Phenodur 899 phenolic resin and a cycloaliphatic epoxy resin prepared from UNOXOL Diol DGE and catechol were dissolved in acrylic monomers in a beaker according to the recipe described in Table I.

TABLE I

| Ingredients | Wt (g) |
| --- | --- |
| UNOXOL Diol DGE/Catechol epoxy resin | 50 |
| MMA | 19 |
| BA | 19 |
| GMA | 6 |
| HEMA | 6 |
| Phenodur 899 | 33 |

To the organic mixture described in Table I above, 5.4 g of Hitenol BC-10 (100% active) were added to the beaker. The contents of the beaker was stirred using a cowles type mechanical stirrer attached to a Rose LS K high shear mixer at a revolution per minute (rpm) of ~5000 for 1-2 minutes (min) To the resulting mixture, water was added approximately at the rate of 3 milliliters per minute (mL/min) while maintaining the stirring. As the water addition progressed, the viscosity of the mixture increased significantly until finally a very thick paste/gel (less than (<) 20% water content) was formed and which was water dilutable (indicating the formation of oil in water type High Internal Phase emulsion). At this point, water addition was suspended for 2 min to obtain uniform mixing of the high viscous/gel mixture. The water addition rate was increased to approximately (~) 20 mL/min for the next stage (dilution stage) to obtain a final water content of 134 g. The resultant dispersion had a $V_{avg}$ particle size of 0.613 micron as measured with a Coulter LS230.

General Polymerization Procedure of Miniemulsion

The previously obtained miniemulsion then was transferred into a polymerization flask equipped with a nitrogen purge, reflux condenser, thermometer, and stirrer. 1 mL of 1% Ferous sulfate solution was added to the miniemulsion and with nitrogen purging, the reaction material was heated to 35° C. Sodium formaldehyde sulfoxylate (SFS) 0.4 g in 10 mL DI water and t-butyl hydro peroxide (t-BHP 70% active solution in water) 0.85 g in 10 g DI water was used as redox initiator pair. The initiator solutions were added to the polymerization flask at rate of 0.1 mL/min to last 1 hour (hr) 40 min. The polymerization temperature was slowly ramped to 60° C. within first 50 min and the polymerization was continued at that temperature under nitrogen purging for a total of 3 hr to obtain a dispersion with a solid content of 41.5% and a particle size of 0.476 micron.

EXAMPLE 2

Preparation of Epoxy-Acrylic Dispersion

A solution of high molecular weight Unoxol Diol Diglycidyl ether/catechol epoxy resin was prepared in acrylic monomers with the recipe described in Table II.

TABLE II

| Ingredients | Wt (g) |
| --- | --- |
| Unoxol Diol DGE/Catechol Epoxy resin | 50 |
| MMA | 27 |
| BA | 20 |
| GMA | 3 |
| HEMA | 5 |

To the organic mixture described in Table II above, 5.g of Hitenol BC-10 was added to the beaker and the contents of the beaker was stirred using a cowles type mechanical stirrer at an rpm of ~3500-4000 for 1-2 min to obtain uniform mixing. To this mixture water was added approximately at the rate of 2 mL/min while maintaining the stirring to form a water dilutable high internal phase emulsion with ~20% water content. The water addition rate was increased to ~20 mL/min for the next stage (dilution stage) to obtain a final water content of 138 g. The resulting miniemulsion had a $V_{avg}$ particle size of 1.02 micron as measured with a Coulter LS230.

The resulting miniemulsion prepared above was transferred into a polymerization flask equipped with a nitrogen purge, reflux condenser, thermometer, and stirrer. 1 mL of 1% Ferrous sulfate solution was added to the miniemulsion and with nitrogen purging, the reaction material was heated to 52° C. Sodium formaldehyde sulfoxylate (SFS) 0.5 g in 10 mL DI water and t-butyl hydro peroxide (t-BHP 70% active solution in water) 0.7 g in 10 g DI water was used as redox initiator pair. The initiator solutions were added to the polymerization flask at rate of 0.15 mL/min to last 1 hour (hr) 40 min The polymerization temperature was slowly ramped to 60-62° C. after first 10 min of initiator addition and the polymerization was continued under nitrogen purging for 40 minutes. The polymerization temperature was raised to 64° C. and the held at that temperature for additional 1 hr 20 minutes to obtain dispersion with a solid content of 36.6% and a particle size of 1.05 micron.

EXAMPLE 3

Preparation of Epoxy—Acrylic Dispersion

A solution of high molecular weight Unoxol Diol Diglycidyl ether/catechol epoxy resin was prepared in acrylic monomers with following recipe described in Table III.

TABLE III

| Ingredients | Wt (g) |
| --- | --- |
| Unoxol Diol DGE/Catechol Epoxy resin | 50 |
| MMA | 27 |
| BA | 20 |
| GMA | 3 |
| HEMA | 5 |

To the organic mixture described in Table III above, 5 g of Hitenol BC-10 was added and the content of the beaker was stirred using a cowles type mechanical stirrer at an rpm of ~3500-5000 for 1-2 min to obtain uniform mixing. To this mixture, water was added at the rate of ~2 mL/min while maintaining the stirring to form a water dilutable high internal phase emulsion with ~20% water content. The water addition rate was increased to ~20 mL/minute for next stage (dilution stage) to obtain a final water content of 147 g.

The resulting miniemulsion prepared above then was transferred into a polymerization flask and polymerization was conducted similar to example 2 with a slight modification in the polymerization temperature. The polymerization temperature was held at 58-62° C. throughout the 2 hr process period. The final dispersion has a particle size of 0.65 µm and a solid content of 36.7%.

EXAMPLES 4 to 7

Preparation of Cycloaliphatic Epoxy Resin Dispersions 100 g of the catechol advanced cyclohexanedimethanol diglycidyl ether cycloaliphatic epoxy resin was dissolved in 85 g of pre-dried MEK solvent. After the polymer solution was charged into 500 mL 4-neck flask reactor equipped with a nitrogen purge, reflux condenser, thermal-couple, and mechanic stirrer, a given amount of succinic anhydride or 4-methylphthalic anhydride was charged into the reactor. After the mixture was heated to reflux, 0.3 g triethylamine (TEA) was added into the reactor as catalyst. FTIR was used to track the reaction until the anhydride absorption peak at 1866.5 cm-1 (for 4-methylphthanlic anhydride, 1854.6 cm-1) was disappeared. The total reaction time was 6.0 hrs (4-methylphthalic anhydride, 7.0 hrs). After reaction finished, the obtained polymer solution was dispersed into a 200 g DI-water containing a given amount of dimethylethanol amine (DMEA) under 600-1000 rpm agitation with a pitched blade during 10 min by direct emulsification. After the agitation was continued for 20 min, the obtained dispersion was transferred into a single-nick flask and stripped with a rotary evaporator at 60° C. to remove the MEK solvent. After striping, solid % of the obtained dispersion was adjusted with DI water. Table IV shows the composition and property of dispersions.

TABLE IV

Composition and Properties of Cycloaliphatic Epoxy Resin Dispersions

| Example | Example 4 | Example 5 | Example 6 | Example 7 |
|---|---|---|---|---|
| Anhydride type | Succinic anhydride | Succinic anhydride | Succinic anhydride | 4-methylphthanlic anhydride |
| Polymer (g) | 100 | 100 | 100 | 100 |
| MEK | 85 | 85 | 85 | 85 |
| Anhydride (wt % of epoxy resin) | 7.5 | 5 | 2.5 | 8.1 |
| DMEA (g, 100% neutralization) | 6.68 | 4.5 | 2.2 | 4.5 |
| Water | 200 | 200 | 200 | 200 |
| Final dispersion adjusted solid % | 25% | 24% | 29% | 27% |
| Particle size (Beckman Coulter, nm) | 66 | 92 | 117 | 958 |
| Stability | no | OK | OK | no |

EXAMPLE 8

Dispersion Example 2 was coated on an electrolytically tin plated carbon steel (ETP) substrate using a #16 wound wire rod. The coated substrate was then treated in a convection oven at 205° C. for 10 min

EXAMPLE 9

12.3 g of Dispersion Example 2, 0.57 g of Cymel 370, 7.14 g of DI water and 0.25 g of 10% phosphoric acid were mixed together using a magnetic stifling bar in a glass vial. The resultant mixture was then coated on an ETP substrate. The coated substrate was then treated in a convection oven at 205° C. for 10 min

EXAMPLE 10

10.93 g of Dispersion Example 2, 1.14 g of Cymel 370, 7.93 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 11

9.56 g of Dispersion Example 2, 1.70 g of Cymel 370, 8.73 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 12

12.30 g of Dispersion Example 2, 0.96 g of Phenodur VPW waterborne epoxy/phenolics, 6.74 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 13

10.93 g of Dispersion Example 2, 1.92 g of Phenodur VPW waterborne epoxy/phenolics, 7.15 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 14

9.56 g of Dispersion Example 2, 2.88 g of Phenodur VPW waterborne epoxy/phenolics, 7.55 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 15

12.23 g of Dispersion Example 2, 1.16 g of Methylon 75108 waterborne dispersion, 6.37 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 16

10.86 g of Dispersion Example 2, 2.31 g of Methylon 75108 waterborne dispersion, 6.58 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 17

9.49 g of Dispersion Example 2, 3.47 g of Methylon 75108 waterborne dispersion, 6.79 g of DI water and 0.25 g of 10% phosphoric acid were mixed together using a magnetic stirring bar in a glass vial. The resultant mixture was then coated on an ETP substrate. The coated substrate was then treated in a convection oven at 205° C. for 10 min

EXAMPLE 18

20 g of Dispersion Example 3, 1.8 g of Georgia Pacific GP4003 waterborne phenolics, 5.39 g of DI water and 0.16 g of Nacure 5965 were mixed together using a magnetic stirring bar in a glass vial. The resultant mixture was then coated on an ETP substrate. The coated substrate was then treated in a convection oven at 205° C. for 10 min

EXAMPLE 19

20 g of Dispersion Example 3, 0.97 g of Cymel 373, 6.20 g of DI water and 0.16 g of Nacure 5965 were mixed together using a magnetic stirring bar in a glass vial. The resultant mixture was then coated on an ETP substrate. The coated substrate was then treated in a convection oven at 205° C. for 10 min

EXAMPLE 20

20 g of Dispersion Example 5, 0.63 g of Cymel 373, 6.64 g of DI water and 0.11 g of Nacure 5965 were mixed together using a magnetic stirring bar in a glass vial. The resultant mixture was then coated on an ETP substrate. The coated substrate was then treated in a convection oven at 205° C. for 10 min

EXAMPLE 21

20 g of Dispersion Example 6, 1.45 g of Georgia Pacific BKU237 waterborne phenolics, 5.22 g of DI water and 0.13 g of Nacure 5965 were mixed together using a magnetic stirring bar in a glass vial. The resultant mixture was then coated on an ETP substrate. The coated substrate was then treated in a convection oven at 205° C. for 10 min.

The following standard analytical equipment and testing methods were used to test the performance of the coatings prepared in the above Examples:

Thickness Measurement

Thickness was measured on dry coatings using a BYK MPOR USB coating thickness gauge. The gauge was zeroed on a bare panel (aluminum) before measuring coatings.

Pendulum Hardness (Konig Hardness)

A BYK Gardner pendulum hardness tester was used to measure Konig hardness based on ASTM D 4366. The pendulum hardness test is based on the principle that the amplitude of the pendulum's oscillation will decrease more quickly when supported on a softer surface. The hardness of any given coating is given by the number of oscillations made by the pendulum within the specified limits of amplitude determined by accurately positioned photo sensors. Therefore, the lower the number given by the counter equals a softer coating and a higher number should equal a harder coating. The Konig test for hard coatings measures the time taken for the amplitude of a triangular pendulum to decrease from 6° to 3°.

Pencil Hardness

Pencil hardness test was conducted according to ASTM method D3363. The gouge hardness, the hardest pencil that will leave the film uncut, was reported.

Crosshatch Adhesion Test

The crosshatch adhesion was measured according to ASTM D 3359. The "B" method has been used because the coating thickness is less than 5 mils in thickness. In this test, a square lattice pattern is made with 10 cuts in each direction with 1 mm distance between two neighboring cuts. A pressure-sensitive tape is applied over the lattice and then removed. The adhesion is evaluated according to the following grade scale:

5B—The edges of the cuts are completely smooth; and none of the squares of the lattice is detached.

4B—Small flakes of the coating are detached at intersections; and less than 5% of the area is affected.

3B—Small flakes of the coating are detached along edges and at intersections of cuts. The area affected is 5 to 15% of the lattice.

2B—The coating has flaked along the edges and on parts of the squares. The area affected is 15 to 35% of the lattice.

1B—The coating has flaked along the edges of cuts in large ribbons, and whole squares have detached. The area affected is 35 to 65% of the lattice.

0B—The flaking and detachment of the coating was worse than grade 1B above.

Lactic Acid Retort

A Tuttnauer EZ10 autoclave was used for the retort test. A 5 cm by 7.5 cm coated panels was put into a glass beaker that was half filled with 2% lactic acid aqueous solution. The beaker was covered with aluminum (Al) foil and then treated in the autoclave at 121° C. for 30 min (or 130° C. for 60 min) The autoclave was allowed to cool to 60° C. before the autoclave was opened and test panels removed. The test panels were rinsed and patted dry and then subjected to a cross-cut adhesion test within 30 min of being removed from the autoclave. The blushing of the panels was ranked from 1 to 5, with 5 being the best ranking.

MEK Double Rubs

The MEK double rub testing was performed in according to ASTM D 5402-06 Method 3 with the testing modified by using a 32 ounce ball peen hammer and Grade 50 bleached cheesecloth. The cloth was fastened with a wire to the flat end of the hammer and the cloth was re-dipped into MEK every 25 double rubs. The cloth was repositioned to a fresh area or replaced after every panel.

The results of the testing methods on the coatings described in the coating Examples 8-21 are shown in the following Table V.

TABLE V

Coating Performance of Different Coating Examples

| Coating Example No. | Thickness (mil) | Konig Hardness (seconds) | Pencil Hardness | Crosshatch Adhesion | Lactic Acid (250° F./121° C., 30 minutes) | MEK Double rub (# cycles) |
|---|---|---|---|---|---|---|
| 8 | 0.44 | 140 | H | 5B | 0 | 5 |
| 9 | 0.50 | 164 | HB | 5B | 0 | 16 |
| 10 | 0.52 | 159 | HB | 5B | 0 | 50 |
| 11 | 0.44 | 162 | F | 1B | 0 | 65 |
| 12 | 0.50 | 119 | B | 5B | 0 | 6 |
| 13 | 0.40 | 139 | B | 5B | 0 | 8 |
| 14 | 0.47 | 157 | B | 5B | 4 | 9 |
| 15 | 0.22 | 179 | B | 2B | 5 | 20 |
| 16 | 0.25 | 168 | HB | 1B | 5 | 25 |
| 17 | 0.26 | 164 | HB | 5B | 5 | 100 |
| 18 | 0.31 | 173 | HB | 5B | 4 | 173 |
| 19 | 0.27 | 143 | HB | 5B | 4 | 143 |
| 20 | 0.33 | 176 | F | 5B | 4 | 176 |
| 21 | 0.37 | 168 | HB | 5B | 4 | 50 |

The invention claimed is:

1. A waterborne dispersion composition comprising (a) a high molecular weight cycloaliphatic epoxy resin and (b) an acrylic polymer or a polymerized product prepared from at least one acrylic monomer dispersed in (c) a liquid aqueous vehicle, wherein the cycloaliphatic epoxy resin is prepared from a cycloaliphatic diglycidyl ether having an oligomer content in the range of from 0.01 wt % to 20 wt %; and/or a monoglycidyl ether content of from 0.01 wt % to 5 wt %, and wherein the cycloaliphatic epoxy resin comprises a diglycidyl ether of cyclohexanedimethanol.

2. The dispersion of claim 1, wherein the acrylic polymer comprises an acrylate and a methacrylate monomer.

3. The dispersion of claim 2, wherein the acrylate and methacrylate monomers comprise methyl acrylate, ethyl acrylate, butyl acrylate, 2-ethylhexyl acrylate, decyl acrylate, methyl methacrylate, ethyl methacrylate, butyl methacrylate, acrylic acid, methacrylic acid, itaconic acid, maleic acid, fumaric acid, styrene, substituted styrene, acrylonitrile, vinyl acetate, other alkyl acrylates having from one to twelve carbon alkyl groups.

4. The dispersion of claim 1, including a dispersant; wherein the dispersant comprising an ionic, a nonionic or an anionic compound.

5. The dispersion of claim 1, wherein the particle size of the solids is in the range of from 100 nanometers to 2000 nanometers.

6. The dispersion of claim 1, wherein the cycloaliphatic epoxy resin is modified with acid groups; or wherein the cycloaliphatic epoxy resin is motified with an anhydride.

7. The dispersion of claim 1, wherein the concentration of the cycloaliphatic epoxy resin ranges from 10 weight percent to 100 weight percent, based on the total weight of the solids of the composition.

8. A metal packaging coating comprising the coating formulation of the waterborne dispersion composition of claim 1.

9. A coated article comprising a metal substrate coated with the coating formulation of claim 1.

10. A process for preparing a waterborne dispersion comprising dispersing a cycloaliphatic epoxy resin and an acrylic polymer or polymerized product prepared from at least one acrylic monomer in a liquid aqueous vehicle, wherein the cycloaliphatic epoxy resin is prepared from a cycloaliphatic diglycidyl ether having an oligomer content in the range of from 0.01 wt % to 20 wt %; and/or a monoglycidyl ether content of from 0.01 wt % to 5 wt %; and wherein the cycloaliphatic epoxy resin is selected from the group consisting of diglycidyl ether of cyclohexanedimethanol, 1,4-cyclohexanedimethanol diglycidyl ether, a diglycidyl ether of a mixture of 1,3- and 1,4-cyclohexane dimethanol diol, 2,2,4,4-tetramethylcyclobutane-1,3-diol diglycidyl ether, and mixtures thereof.

11. The process of claim 10, wherein the process is carried out by (i) mechanical means in presence of a dispersant; (ii) grafting of resin with acid functionality and then dispersing the grafted resin in the liquid aqueous vehicle; or (iii) emulsification of resin in the presence of unsaturated monomers and subsequent miniemulsion polymerization.

12. A waterborne dispersion composition comprising (a) a high molecular weight cycloaliphatic epoxy resin and (b) an acrylic polymer or a polymerized product prepared from at least one acrylic monomer dispersed in (c) a liquid aqueous vehicle, wherein the cycloaliphatic epoxy resin is prepared from a cycloaliphatic diglycidyl ether having an oligomer content in the range of from 0.01 wt % to 20 wt %; and/or a monoglycidyl ether content of from 0.01 wt % to 5 wt %, and wherein the cycloaliphatic epoxy resin comprises 1,4-cyclohexanedimethanol diglycidyl ether, a diglycidyl ether of a mixture of 1,3- and 1,4-cyclohexane dimethanol diol, 2,2,4,4-tetramethylcyclobutane-1,3-diol diglycidyl ether or mixtures thereof.

\* \* \* \* \*